Aug. 4, 1953 A. BRUNAND 2,647,696
STATOR WINDING MACHINE
Filed Nov. 22, 1949 5 Sheets-Sheet 1

INVENTOR:
André Brunand
By Wenderoth, Lind & Ponack
ATTORNEYS

Aug. 4, 1953

A. BRUNAND 2,647,696

STATOR WINDING MACHINE

Filed Nov. 22, 1949

INVENTOR:
André Brunand
By Wenderoth, Lind & Ponack
ATTORNEYS

Aug. 4, 1953

A. BRUNAND 2,647,696

STATOR WINDING MACHINE

Filed Nov. 22, 1949

INVENTOR:
André Brunand

By Wenderoth, Lind & Ponack
ATTORNEYS

Fig. 8.

Patented Aug. 4, 1953

2,647,696

UNITED STATES PATENT OFFICE 2,647,696

STATOR WINDING MACHINE

André Brunand, Lyon, France, assignor to Societe Anonyme styled: Compagnie Electro-Mecanique, Paris, France Application November 22, 1949, Serial No. 128,729
In France November 23, 1948

4 Claims. (Cl. 242—1)

This invention is concerned with a machine designed to automatically wind A. C. electric machine stators irrespective of the number of phases and poles either by winding the coils one by one or by simultaneously winding several coils which may or not belong to the same phase.

In some instances, for example in the production of 4- or 8-pole 3-phase machines, a machine according to this invention makes it possible to wind each phase continuously without intermediate soldering by simultaneously leading the homologous wires in the three phases.

This automatic stator-winding machine comprises as its winding member a shuttle which is smaller in diameter than the bore of the stator and which is reciprocated therethrough in order to lay the wire into the slots in the stator; on the other hand, said stator and shuttle are rotated intermittently with respect to one another; it is characterized thereby that the wire or wires are guided according to the requirements by one or several fingers located at the periphery of said shuttle, retractable within said shuttle during the time same is traversed through the bore in the stator and projected out of it again as the shuttle comes out of said bore for the purpose of bringing the wires to the position corresponding to the beginning of the formation of the coil heads.

Said coil heads may be formed by angularly displacing either the stator with respect to the shuttle or the latter with respect to the former; in the course of such a displacement the wires which are held in position by the finger or fingers are guided by guiding members the position and shape of which correspond to final position and shape of the coil heads.

The wire or wires are set in position in the notch or notches in the stator by the finger or fingers which during the time the slide is moved through the bore remain at a very small distance from the wall of the same and insert the permanently stretched wires into the notches in the stator which is locked in its position for the whole time the shuttle is moved through the bore.

An embodiment of such an automatic machine, designed for the continuous and jointless winding of the stator of a 4-pole 24-notch 3-phase motor yet also useful in any other winding work with or without soldered joints will now be described for the purpose of exemplification but in no ways of limitation, reference being had to the appended drawing.

In this instance the rotatable element is the stator.

The winding machine that provides the subject-matter of this invention comprises a frame 1 formed on the one hand with a head 2 in which a chuck 3 is rotatably mounted this chuck 3 being a support adapted to hold coaxial therewith the stator 4 to be wound, and on the other hand with a portion 5 in which a shuttle 6 is slidably guided in its reciprocatory displacements coaxial with chuck 3 and stator 4.

The frame 1 carries the whole of the means for the driving and transmission of movement of the aforesaid elements said means being of any conventional type and having no bearing upon the present invention; for a better understanding of the operation of the machine they will nevertheless be described hereinafter and are illustrated for the purpose of explanation and by no means of limitation in Figs. 3 and 4. For instance, they may comprise (see Fig. 4) a motor 50 fed through the medium of a switch 51 and a switchbox 62; a main shaft 53 driven at a uniform speed from the motor 50 through a belt 54 and the flywheel 55. Keyed on the said main shaft 53 are a cam 56 adapted to reciprocate the slide through transmission means 57; a cam 58 adapted through transmission means 59 to displace the stator angularly stepwise an amount corresponding to the pitch of smaller coils; a cam 60 adapted through the same transmission means 59 to displace the stator angularly stepwise an amount corresponding to the pitch of larger coils; the cams 58 and 60 are operatively connected alternatively with the transmission system 59 by means of a member 61 which is actuated by the cam 69 (see Fig. 3), the cam 62 provided with notches $N_1$ and $N_2$, said cam 62 being adapted to lock the chuck 3 in position and to unlock it through the medium of transmission means 63; a helical gear wheel 64 drives a further helical wheel 65 formed with the same number of teeth and freely rotatable on a second motion shaft 66.

Figure 3:
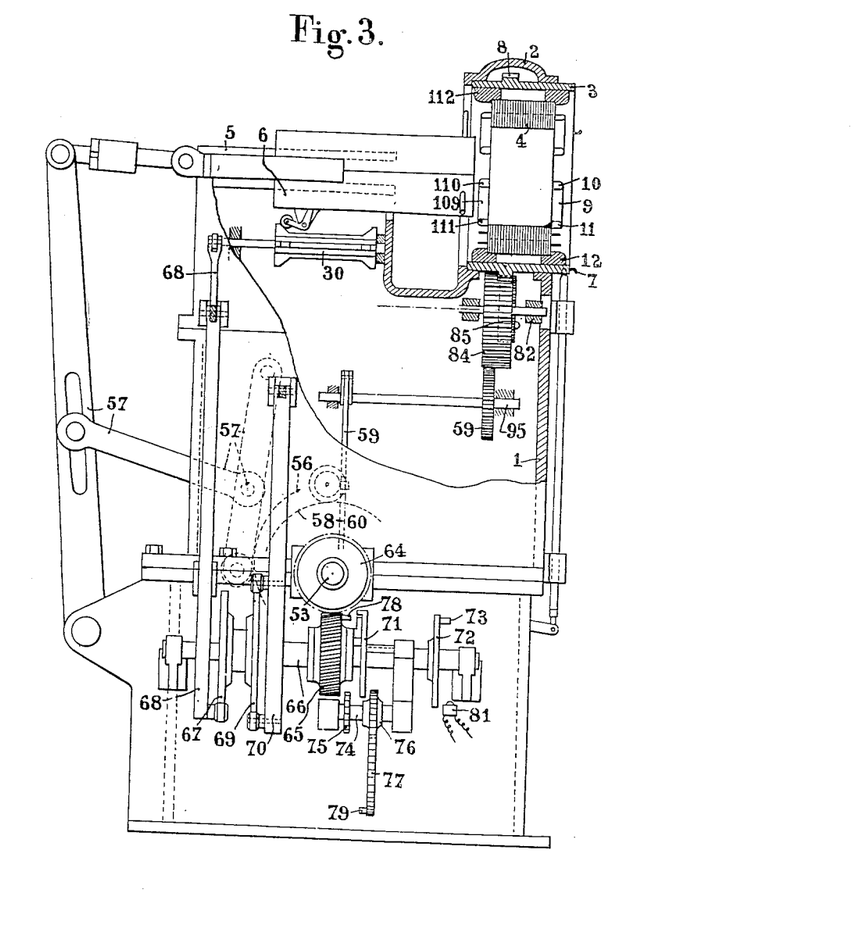
Figure 3 is an elevational view of the whole machine, the upper portion being a section through the axis of the stator.

Figure 3 shows the said helical gear wheel 65 together with the second motion shaft 66 on which there are keyed: a cam 67 adapted to change the cam bosses that control the protraction of wire-guiding fingers as the machine is shifted from the formation of outer plane coils to that of inner plane coils, and this, through the medium of the transmission means 68; the cam 69 which is adapted through the medium of the transmission means 70 to shift the member 61 to alternatively set into action the cam 58 assigned to the winding of the smaller coils in the outer and the inner planes or the cam 60 assigned to the winding of the larger coils in the aforesaid planes; a claw coupling 71 adapted by coupling the helical wheel 65 with the shaft 66 to rotate the second motion shaft 66 half a turn whenever the clutch 71 comes into action.

A turn counter 74 is composed of a wheel 75 rigid with a sprocket wheel 76 over which there is a chain 77 in which the number of links can be varied in accordance with the number of turns in each coil; a pin 78 projecting from the one side of the wheel 65 is adapted at each revolution of the latter to angularly displace the wheel 75 in such a manner that the chain 77 is moved along the distance of one link; a special link 79 is designed to set the clutch 71 into action.

At the completion of each revolution of a disc 72 firm with the shaft 66 a side-pin 73 through the medium of a relay 81 will close the circuit through the electromagnet 82 and simultaneously switch out the main motor 50. As the electromagnet 82 comes to the end of its stroke a small auxiliary motor 83 is switched in. The gear wheel 84 disengaged from the gear wheel 59 is then in meshing engagement with the transmission gear wheel 85 driven by the auxiliary motor which thus moves the stator to bring the notch $e$ to winding position; upon the completion of this movement a system of relays brings the gear wheel 84 back to its original position and switches out the auxiliary motor while the main motor 50 is switched in.

Figure 4:
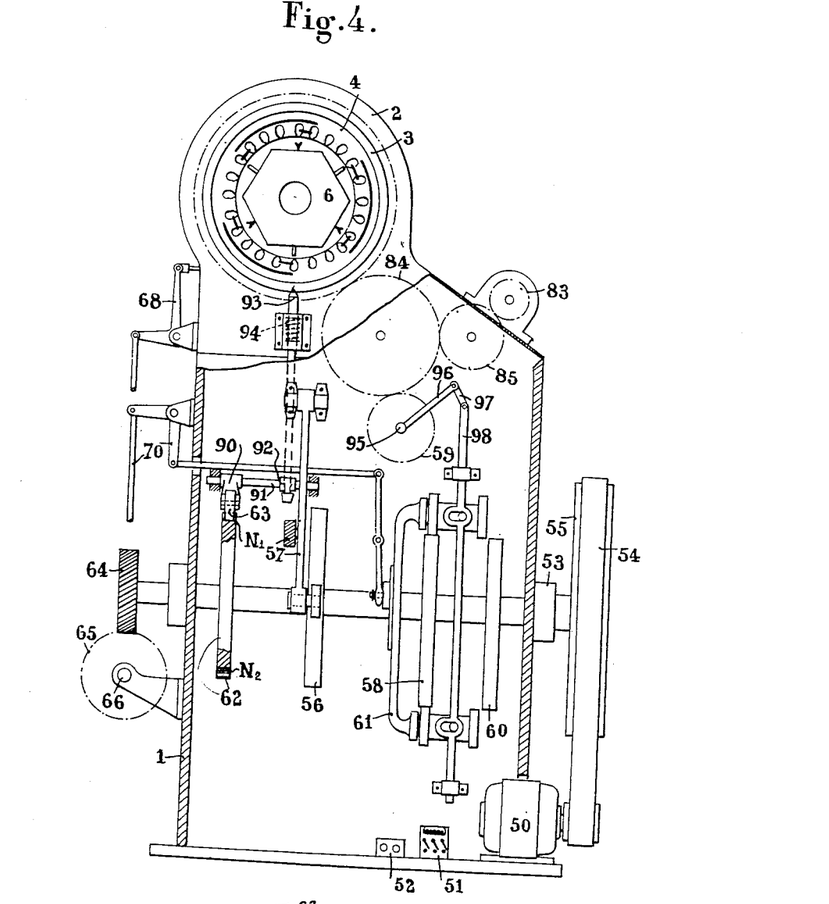
Figure 4 is a side view of the whole machine, of which the lower portion is shown in section.

The chuck 3 is rigid with a gear wheel 8 which is displaced angularly alternatingly by the cams 58 and 60 through the transmission means illustrated diagrammatically in Fig. 4.

Now that the driving and transmission means have been described hereinabove by way of example and merely for the sake of a better understanding of the operation of the machine, it is recalled that the invention is concerned more particularly with the following.

The frame 1 carries a head 2; a chuck 3 adapted to center and firmly hold the stator 4 to be wound is rotatably mounted within said head 2. A guide for the reciprocation of the shuttle 6 is provided in the portion 5 of the frame 1. The chuck 3 carries hooks 7 to which the wires are anchored at the beginning of the winding operation and which is rotated by means of the spur ring 8.

The side-guides 9, 10, 11 that serve to form the coil heads on the one side are secured to a ring 12; on the other side similar side-guides 109, 110, 111 are secured symmetrically to a ring 112. The rings 12 and 112 serve to center and rotate the medium of the chuck 3 and stator through the spur ring 8. The set of side-guides 9 and 109 serve to form the windings of an outer winding plane 40, the set of side-guides 10, 110, 11, 111 serve to form the windings of an inner winding plane 41.

Carried by the shuttle 6 at the side thereof which is adjacent to the stator are three fingers 13 angularly spaced an amount of 120° which serve to guide the wires throughout the winding operation both in the laying of the same into the notches and in the formation of the coil heads. The reciprocatory movement of the shuttle 6 along the axis of the stator is transmitted from the cam 56 through the lever and link system diagrammatically shown at 57 in Fig. 4.

Figure 5:
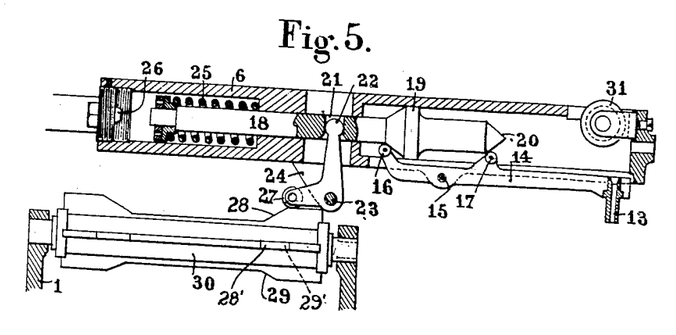
Figures 5 and 6 are views of the shuttle and respectively show the mechanism by which the fingers are retracted and protracted (Fig. 4) and the position of the three fingers which are necessary in the winding of a 3-phase 4-pole stator.

The fingers 13 (see Fig. 5) are carried by levers 14 pivoted on pins 15 and carrying followers 16, 17. A member 18 slidably mounted in the shuttle 6 is formed with a pair of conical cam faces 19, 20 and with a slot 21 in which is engaged the one end of a bell crank lever 22 pivoted at 23 in a fork 24 rigid with the shuttle 6. A spring 25 urges a slide-member 18 at its side remote from the stator towards the adjustable stop 26. The bell crank lever 22 carries a follower 27 at the free end of its other arm which runs in turns on four cam faces, which are cam-shaped roller-tracks 28, 28', 29, 29'; these roller tracks have different profiles and are provided at an angular distance of 90° on a cam bearer 30 rotatably mounted in bearings firm with the frames and the portion 5 of the same; the rotation through an angle of 90° by which the roller tracks 28, 28', 29, 29' are successively set into action is obtained through the medium of the cam 67 and of the transmission means 68 shown diagrammatically in Fig. 3.

As shown in Figs. 3 and 4, the machine may simultaneously wind several phases in the rotor in the following manner. The shuttle of the machine has a reciprocating motion coaxial with the rotor and with the rotatable support of the rotor. The shuttle is provided with wire-laying hollow fingers 13, which are mounted on levers 14, disposed around the shuttle for swinging motion in radial planes. The simultaneous swinging motion of levers 14 is obtained by means of the movement of slide-member 18 which is coaxial with the shuttle body and actuates levers 14 by the cam faces 29. In this manner the pivotal amplitude or angular displacement of levers 14 is in direct relationship to and controlled by the displacement of slide-member 18 with respect to the shuttle body. In turn, the angular displacement of slide-member 18 is controlled by the angular displacement of bell crank lever 22. Throughout the duration of each reciprocating stroke of the shuttle, the angular displacement of bell crank lever 22 varies in accordance with its relationship to the profile of fixed cam track 28 in engagement with bell crank lever 22, the latter cam track cooperating with the sliding motion of the shuttle. The relationship between the bell crank lever 22 and fixed cam track 28 may be modified by changing the cam to substitute a new profile in cam track 29 for that of cam track 28. The cam bearer 30 rotatably mounted in bearing on the frames and secured portion at 5 permits the substituting engagement of either cam track 28 or cam track 29.

Figure 6:
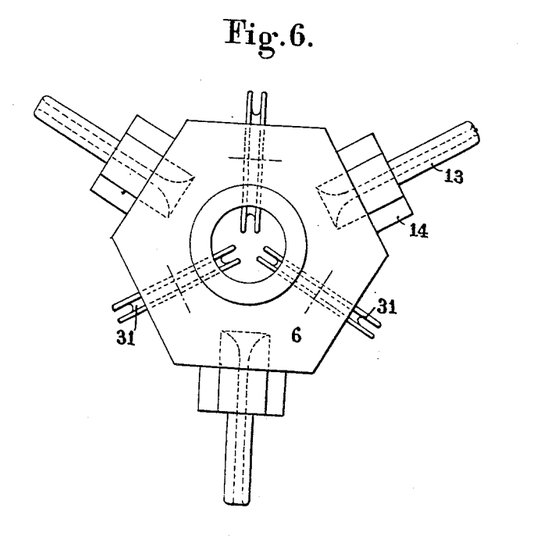

Fig. 6 is an end view of the shuttle, which is hexagonal in section, and shows the 120° angular spacing of the fingers 13; the three grooved discs 31 mounted in the planes of the three fingers receive the wires from the rear end of the shuttle and guide them towards the inlets in the fingers within the shuttle.

Figure 1:
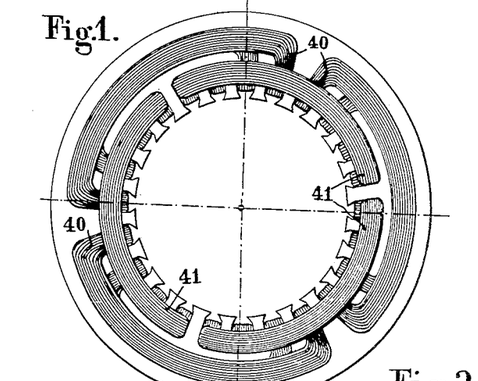
Figure 1 illustrates the winding to be obtained and shows the shapes and positions of the coils both in the outer and the inner planes.
Figure 7:
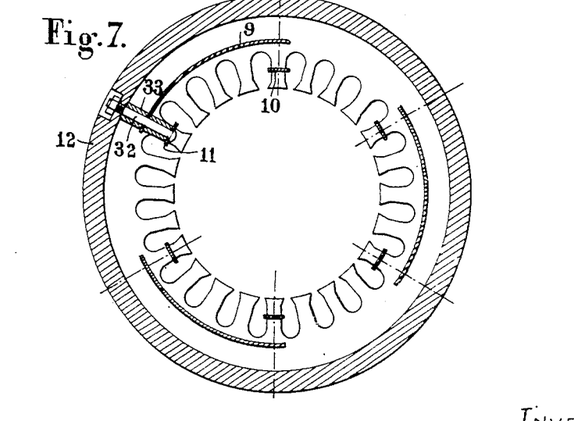
Figure 7 illustrates the position of the guiding means adapted to shape the coil heads.

The side-guides 9, 10, 11 that serve to form the coil heads (see Fig. 7) are secured to the rings 12 by means of six bolts 32 (only one of which is shown in the drawing) projecting through exchangeable tubular distance pieces 33 by means of which the desired intervals are set between the guides for the insertion of the wires. Consequently, the six bolts 32 arranged at the intersections of the smaller coils of either plane (the inner and the outer plane according to Fig. 1) act as rests for the wires in the formation of the coil heads. The rings 12 limit the axial extension of the latter.

Figure 8:
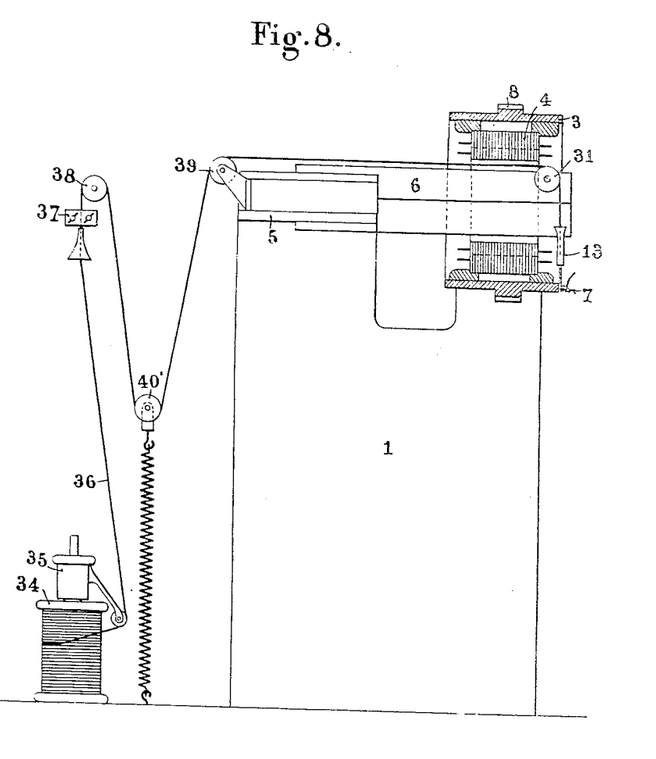
Figure 8 diagrammatically shows the paths of the leads and the way the machine is supplied with wire.

Fig. 8 diagrammatically shows the leading of the wire to its insertion in the stator. The spools 34 are arranged on a pay-off device 35; the wire 36 is led through a wire-breaking 37 adapted to set a definite tension thereupon, then over a pulley 38 towards the shuttle 6. The three wires are guided by as many tensioning sheaves 40' and guiding sheaves 39 along the outsides of the hexagonal shuttle 6 to the guide rollers 31 shown in Fig. 6 and thence through the fingers 13.

The winding operation is effected as follows: The stator provided with the rings 12 and the guides 9, 10, 11 is set in the chuck 3; the wires are then laid as shown in Fig. 8, once the shuttle 6 has been shifted to the right through the bore. The three wires that project out of the three fingers 13 are anchored to the hooks 7. With the wires thus maintained at their free ends in contact with the one side of the chuck 3 and remaining loose at their spool sides they will be wound off from spools 34 automatically as a result of the reciprocation of the shuttle and of the angular displacements of the stator. The machine is then switched in and the following operations are effected automatically and successively by the same, said operations being only described in connection with the one of the three phases yet which occur simultaneously in the three phases.

A. The chuck 3 is locked by the cam 62;

B. The shuttle is moved towards the bore by the cam 56; lever 22 disengages the cam-shaped roller-track 28; slide-member 18 is returned into engagement with stop 26 by spring 25; the follower 16 is moved upwards by the conical cam face 19, whereby lever 14 is swung about its pivot 15. Finger 13 is retracted to a position within and slightly clear of the bore in the stator.

C. The shuttle is moved through the bore from the right to the left (see Fig. 8) and inserts the wire into the slot $a$ (see Fig. 2).

D. The shuttle comes to the end of its stroke through the stator; follower 27 on lever 22 engages the cam-shaped roller-track 28 whereby member 18 is moved forwards with respect to the slide; follower 16 is thus released while the conical cam surface 20 by depressing the follower 17 swings the lever 14 about its pivot 15. The finger 13 is thus protracted to insert the wire into the slot $a$ and bring it behind the guide 9.

E. The shuttle stops, the chuck is unlocked and the stator is moved angularly by the cam 58; the wire is laid behind the guide 9 with a view to form the outer plane 40.

F. The angular displacement of the stator comes to its end and the chuck 3 is locked by the cam 62.

G. The fingers are moved inwards and retracted.

H. The shuttle is moved backwards through the bore from the left to the right (see Fig. 8) and the wire laid into the slot $b$.

I. The shuttle comes to the end of its displacement and the wire laid home in the bottom of the notch $b$ owing to the protracting of the finger.

K. The shuttle stops, the chuck 3 is released and the stator is moved angularly back to its original position.

L. The helical gear wheel 64 is rotated the extent of one revolution and the counter chain moved on the extent of one link.

The cycle of operation thus described results in the production of one turn in the coil attended with one full revolution of the main shaft 53. The movements of the shuttle and of the stator with respect to each other and the locking of the said stator are synchronized by suitably positioning the cams 56, 58 and 62 angularly on the main shaft 53.

The same cycle of operations is recommenced as many times as turns are present in the coil.

The complementary operations effected after the completion of the last turn in the smaller coil in the outer plane (slots $a$ and $b$ in Fig. 2) are as follows:

M. The clutch 71 is set into engagement and the second motion shaft 66 rotated the extent of half a revolution.

N. Cam 60 is set into, and cam 58 out of engagement, with the result that the amplitude of rotation of the stator is changed.

O. Cam-bearer 30 is moved angularly the extent of one fourth of a revolution and the following roller-track 28' is set into engagement, no change occurring in the movement of the fingers.

P. Disc 72 is rotated the extent of one half of a revolution.

Figure 2:
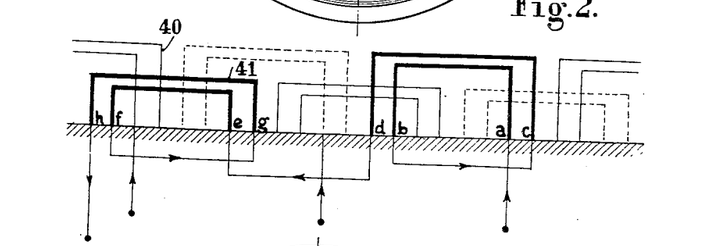
Figure 2 illustrates the corresponding 2-plane winding diagram, equal numbers of similar coils being provided in each plane for each of the three phases whereby, with their inputs angularly displaced an amount of 120° with respect to one another the three phases can be wound simultaneously without soldered joints. The connections between the coils, which are made of continuous wire by the machine, are only indicated for the first phase which is drawn in thick lines while the second phase is drawn in lines and the third phase in dotted lines.

The machine as a whole is then ready for the winding of the second coil, that is, of the larger coil in the outer plane (notches $c$ and $d$ as shown in Fig. 2) and performs its duty uninterruptedly.

Once the two coils are finished the complementary operations subsequent to the completion of the last turn are as follows:

R. Cam 58 is set again into engagement.

S. The following roller-track 29 is set into engagement, whereby the fingers are moved to a position behind the guides 10 and 11.

T. The circuit through relay 81 is closed and the motor 50 stopped; the wheel 84 is shifted out of engagement with 59 into engagement with 85 and the stator angularly displaced so as to substitute notch $e$ for notch $d$ (see Fig. 2).

U. As the angular displacement of the stator comes to its end the auxiliary motor 83 is stopped, the wheel 84 shifted back from engagement with 85 into engagement with 59 and the motor 50 switched in again.

The machine is then ready for the winding of the two coils in the inner plane 41 (notches $e, f$ and $g, h$, see Fig. 2) by a repetition of the same cycle as described in connection with the two preceding coils.

Since the three phases are homologous and wound simultaneously, the winding operation is then wholly completed.

The machine is stopped by relay 81 following the return of all its parts back to their original positions.

The wires are cut; the shuttle 6 is shifted back by turning the crank-handle of the shaft, and the wound stator is then taken out from the machine. Another stator is then placed in position, the shuttle 6 is shifted back by hand completely to the right; the new ends of the wires are then anchored to the hooks 7.

Figure 4A:
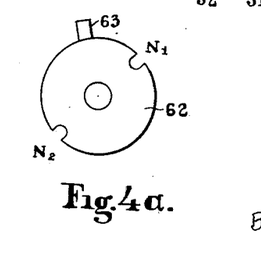
Fig. 4a is a side view of the cam 62 shown in Fig. 4.

Cam 62 of Figures 4a and 9 carries 2 notches disposed at 180° to each other ($N_1+N_2$) corresponding to the former locking positions. Lever 90 carries a friction roller 63 in contact with the outside of cam 62. During the movement of one of the notches, the lever is pivoted about its axis 91, and by means of lever 92 frees bolt 93 which is acted on in the notch of the chuck 3 by the spring 94.

In the normal position shown in Figure 3, the spur ring 8 of chuck 3 and the gear wheels 84 and 59 are in engagement. On axis 95 of Figure 4 the carrying gear wheel 59 is joined to hooked lever 96 by means of the intermediate link 97 to lever 98 from which the displacement is secured by the cams 58 or 60 following the coils during the course of operation. The alternating rotation of the chuck is thus well provided for by gears 59 or 60 at the appropriate time.

The auxiliary motor 83 provides for controlling the rotational displacement of the stator after the winding of the six first coils 40 (Figure 1) has been completed and when it is desired to pass over to the winding of the six coils 41. To conduct this operation, gear wheel 84 functions like a sliding gear or clutch and is acted upon by the electromagnet 82 which is controlled by the closing relay 81.

Gear wheel 84 then disengages from gear wheel 59 to come into engagement with gear wheel 85. Motor 50 is then cut off and motor 83 is then cut in by means of terminal commutator at the end of the lateral path of gear wheel 84. At the completion of the rotation of the stator, motor 83 is cut out of the circuit since the electromagnet 82 and the gear wheel resume their original position to pass current through motor 50.

It will be appreciated that such a machine can perform any other kind of winding work irrespective of the number of notches, poles and planes to be obtained as well as of the size of the stator; the only adjustments to be carried out in each case are as follows:

The choice of a shuttle having a size which corresponds to the diameter of the bore of the rotor.

The position, shape and number of the coil head forming guides.

The angular displacements of the stator and the shuttle with respect to each other and the amplitude of the travel of the shuttle through the stator.

Likewise, the number and position of the fingers in operation on the shuttle are dependent on the number of phases and of poles in the stator to be wound.

Where it is not possible to wind the stator in one single operation without soldered joints the machine is stopped and the wires cut, the soldering work being performed subsequently at all the joints after the winding work is completed.

What I claim is:

1. A machine for winding simultaneously several phase-windings of multiphase multipolar alternating current stators provided with notches and designed for having several winding planes, which machine comprises a frame, a support rotatably mounted on said frame and adapted for the coaxial holding of the stator to be wound, a set of side-guides for each winding plane of the stator, said side-guides being firm with said support and arranged on each side of the stator, a shuttle mounted on the frame of the machine for coaxial reciprocation through the bore of the stator held in the support, said shuttle including an oblong body, a plurality of levers distributed around said body and mounted thereon for radial swinging motion with regard thereto, said levers being in number equal to that of the phase-windings of the stator to be simultaneously wound, a hollow finger on each lever, a slide-member mounted coaxial with the body of the shuttle for longitudinal motion along the same and having cam-faces in engagement with said levers, said cam-faces being designed for swinging simultaneously the levers and for setting the hollow fingers thereof at a common distance from the body depending on the amplitude of displacement of said slide-member along said body, a control lever fulcrumed on said body and having a connection with said slide member, said control lever having one arm protruding out of said body, a cam-bearer mounted on the frame of the machine for successive displacements with regard thereto and having a set of cams adapted for successive engagement with said arm in said successive displacements, each cam being designed for pivoting the control lever and displacing the slide member so as to keep the hollow fingers of the shuttle within the bore of the stator during the greater part of each reciprocation stroke of the shuttle and for protruding said fingers at the end of each reciprocation stroke and bringing them behind one of the aforesaid set of side-guides on the side of the stator, feeding means on the frame for feeding a wire through each of said hollow fingers, means for producing intermittent reciprocation strokes of the shuttle through the bore of the stator, thereby reciprocating the arm of the control lever along the cam in engagement therewith and causing the hollow fingers to simultaneously lay their wires into notches during each reciprocation stroke and to be brought simultaneously at the end of each stroke to a position for engagement of their wires behind side-guides of the support by angular displacement of this latter, means for producing alternatingly in either direction an angular displacement of the support in each interval of time between two successive reciprocation strokes of the shuttle, thereby causing the hollow fingers to engage simultaneously their wires behind the side-guides, and means for selectively producing successive displacements of the cam-bearer and causing the successive engagement of the cams thereof with the arm of the control lever.

2. A machine for winding simultaneously several phase-windings of multiphase multipolar alternating current stators provided with notches and designed for having several winding planes, which machine comprises a frame, a support rotatably mounted on said frame and adapted for the coaxial holding of the stator to be wound, a set of side-guides for each winding plane of the stator, said side-guides being firm with said support and arranged on each side of the stator, a shuttle mounted on the frame of the machine for coaxial reciprocation through the bore of the stator held in the support, said shuttle including an oblong body, a plurality of levers distributed around said body and mounted thereon for radial swinging motion with regard thereto, said levers being in number equal to that of the phase-windings of the stator to be simultaneously wound, a hollow finger on each lever, a slide-member mounted coaxial with the body of the shuttle for longitudinal motion along the same and having cam-faces in engagement with said levers, said cam-faces being designed for swinging simultaneously the levers and for setting the hollow fingers thereof at a common distance from the body depending on the amplitude of displacement of said slide-member along said body, a control lever fulcrumed on said body and having a connection with said slide member, said control lever having one arm protruding out of said body, a cam-bearer rotatably mounted on the frame of the machine and having a set of cams distributed about the same, said cams being adapted for successive engagement with said arm in successive angular positions of said cam-bearer, each cam being designed for pivoting the control lever and displacing the slide member so as to keep the hollow fingers of the shuttle within the bore of the stator during the greater part of each reciprocation stroke of the shuttle and for protruding said fingers at the end of each reciprocation stroke and bringing them behind one of the aforesaid set of side-guides on the side of the stator, feeding means on the frame for feeding a wire through each of said hollow fingers, means for producing intermittent reciprocation strokes of the shuttle through the bore of the stator, thereby reciprocating the arm of the control lever along the cam in engagement therewith and causing the hollow fingers to simultaneously lay their wires into notches during each reciprocation stroke and to be brought simultaneously at the end of each stroke to a position for engagement of their wires behind side-guides of the support by angular displacement of this latter, means for producing alternatingly in either direction an angular displacement of the support in each interval of time between two successive reciprocation strokes of the shuttle, thereby causing the hollow fingers to engage simultaneously their wires behind the side-guides, and means for selectively producing angular displacements of said cam-bearer and causing the successive engagement of the cams thereof with the arm of the control lever.

3. A machine for winding simultaneously several phase-windings of multiphase multipolar alternating current stators provided with notches and designed for having several winding planes, which machine comprises a frame, a support rotatably mounted on said frame and adapted for the coaxial holding of the stator to be wound, a set of sideguides for each winding plane of the stator, said side-guides being firm with said support and arranged on each side of the stator, a shuttle mounted on the frame of the machine for coaxial reciprocation through the bore of the stator held in the support, said shuttle including an oblong body, a plurality of levers distributed around said body and mounted thereon for radial swinging motion with regard thereto, said levers being in number equal to that of the phase-windings of the stator to be simultaneously wound, a hollow finger on each lever, a slide-member mounted coaxial with the body of the shuttle for longitudinal motion along the same and having cam-faces in engagement with said levers, said cam-faces being designed for swinging simultaneously the levers and for setting the hollow fingers thereof at a common distance from the body depending on the amplitude of displacement of said slide-member along said body, a control lever fulcrumed on said body and having a connection with said slide member, said control lever having one arm protruding out of said body, a cam-bearer mounted on the frame of the machine for successive displacements with regard thereto and having a set of cams adapted for successive engagement with said arm in said successive displacements, each cam being designed for pivoting the control lever and displacing the slide member so as to keep the hollow fingers of the shuttle within the bore of the stator during the greater part of each reciprocation stroke of the shuttle and for protruding said fingers at the end of each reciprocation stroke and bringing them behind one of the aforesaid set of side-guides on the side of the stator, feeding means on the frame for feeding a wire through each of said hollow fingers, means for producing intermittent reciprocation strokes of the shuttle through the bore of the stator, thereby reciprocating the arm of the control lever along the cam in engagement therewith and causing the hollow fingers to simultaneously lay their wires into notches during each reciprocation stroke and to be brought simultaneously at the end of each stroke to a position for engagement of their wires behind sideguides of the support by angular displacement of this latter, means for producing alternatingly in either direction an angular displacement of the support in each interval of time between two successive reciprocation strokes of the shuttle, thereby causing the hollow fingers to engage simultaneously their wires behind the side-guides, means for selectively locking said support on the frame of the machine after each angular displacement of said support and unlocking the same before each angular displacement, and means for selectively producing successive displacements of the cam-bearer and causing the successive engagements of the cams thereof with the arm of the control lever.

4. A machine for winding simultaneously several phase-windings of multiphase multipolar alternating current stators provided with notches and designed for having several winding planes, which machine comprises a frame, a support rotatably mounted on said frame and adapted for coaxial holding of the stator to be wound, a set of side-guides for each winding plane of the stator, said side-guides being firm with said support and arranged on each side of the stator, a shuttle mounted on the frame of the machine for coaxial reciprocation through the bore of the stator held in the support, said shuttle including an oblong body, a plurality of levers distributed around said body and mounted thereon for radial swinging motion with regard thereto, said levers being in number equal to that of the phase-windings of the stator to be simultaneously wound, a hollow finger on each lever, a slide-member mounted coaxial with the body of the shuttle for longitudinal motion along the same and having cam-faces in engagement with said levers, said cam-faces being designed for swinging simultaneously the levers and for setting the hollow fingers thereof at a common distance from the body depending on the amplitude of displacement of said slide-member along said body, a control lever fulcrumed on said body and having a connection with said slide member, said control lever having one arm protruding out of said body, a cam bearer mounted on the frame of the machine for successive displacements with regard thereto and having a set of cams adapted for successive engagement with said arm in said successive displacements, each cam being designed for pivoting the control lever and displacing the slide member so as to keep the hollow fingers of the shuttle within the bore of the stator during the greater part of each reciprocation stroke of the shuttle and for protruding said fingers at the end of each reciprocation stroke and bringing them behind one of the aforesaid set of side-guides on the side of the stator, feeding means on the frame for feeding a wire through each of said hollow fingers, means for producing intermittent reciprocation strokes of the shuttle through the bore of the stator, thereby reciprocating the arm of the control lever along the cam in engagement therewith and causing the hollow fingers to simultaneously lay their wires into notches during each reciprocation stroke and to be brought simultaneously at the end of each stroke to a position for engagement of their wires behind side-guides of the support by angular displacement of this latter, means for producing alternatingly in either direction an angular displacement of the support in each interval of time between two successive reciprocation strokes of the shuttle, thereby causing the hollow fingers to engage simultaneously their wires behind the side-guides, means for selectively producing successive displacements of the cam-bearer and causing the successive engagement of the cams thereof with the arm of the control lever, and means for selectively altering the amplitude of the angular displacements of the support with regard to the frame of the machine whenever another set of windings having another polar angle is to be wound.

ANDRÉ BRUNAND.

References Cited in the file of this patent

UNITED STATES PATENTS

| Number | Name | Date |
|---|---|---|
| 1,370,744 | Diehl | Mar. 8, 1921 |
| 1,612,026 | Jannell | Dec. 28, 1926 |
| 1,977,828 | Laib et al. | Oct. 23, 1934 |
| 2,197,117 | Amman et al. | Apr. 16, 1940 |
| 2,304,520 | Wirtz et al. | Dec. 8, 1942 |